UNITED STATES PATENT OFFICE.

GEORGE W. MILES, OF BELMONT, MASSACHUSETTS.

CELLULOSE DERIVATIVE AND PROCESS OF MAKING THE SAME.

No. 838,350.  Specification of Letters Patent.  Patented Dec. 11, 1906.

Application filed November 23, 1904. Serial No. 234,096. (Specimens.)  REISSUED

*To all whom it may concern:*

Be it known that I, GEORGE W. MILES, a citizen of the United States, and a resident of Belmont, in the county of Middlesex and State of Massachusetts, have invented new and useful Improvements in Cellulose Derivatives and Processes for Making the Same, of which the following is a specification.

My invention relates to cellulose derivatives; and it consists in a new method of producing cellulose derivatives and of the product of my new method or process. This invention is, moreover, in the best mode of its practice known to me supplemental to and consequent upon my invention shown and described in Letters Patent of the United States No. 733,729, dated July 14, 1903, which is characterized by the reaction between cellulose and the anhydrid of a monobasic fatty acid in the presence of a condensing agent, the condensing agent being one of those substances which if associated with cellulose in the presence of water will bring about hydrolysis of the cellulose. My process described in the patent aforesaid is further characterized by the fact that by its aid cellulose esters can be formed by the direct association of the anhydrid with fibrous or natural cellulose without previous resort to modification of the cellulose by translation thereof into the hydrate. With respect to the process hereinbelow described, which constitutes part of my present invention, the formation by my patented process of cellulose esters directly from fibrous or natural cellulose assumes a new importance, because, so far as I am able to judge from experiment and demonstration, useful results are derived from the employment of my present process only when none of the previous steps has involved hydration of the cellulose in any substantial degree.

My process presently to be described "starts," so to speak, where my patented process leaves off—that is to say, it starts from the formation of a cellulose ester of a monobasic fatty acid. If such cellulose ester has been formed by a process which involved at some stage the production of cellulose hydrate, then the steps which characterize my new process fail to accomplish any results which, so far as I know, are of practical value. The primary requisite therefore is the formation of a cellulose ester of a monobasic fatty acid by an anhydrous process. The process described in my patent aforesaid is such a one, no water, practically speaking, having been allowed to enter into the reaction or combination.

My new method is characterized by the partial or incomplete hydration of a cellulose ester of a monobasic fatty acid which itself has been formed by a process or method wherein the formation of cellulose hydrate did not occur. My product is a partly-hydrated cellulose acetate, (or analogous ester,) not an acetylated (or esterified) cellulose hydrate. I have found that by employing various degrees of partial or incomplete hydration of such a cellulose ester—in other words, by varying the quantitative proportions of water employed to effect the partial hydration—a variety of products may be formed which differ in their characteristics, especially in respect to their behavior with the solvents which serve as effective vehicles therefor. These products are therefore suitable to miscellaneous commercial uses; but the process of obtaining them is in each case properly though generally defined as a partial hydration of a cellulose ester of a monobasic fatty acid.

For the purpose of descriptive illustration, as the most readily-available anhydrid of a monobasic fatty acid is acetic anhydrid and the best known condensing agent therefor with cellulose is sulfuric acid, I shall confine the following specification to a description of my process as applied to the partial or incomplete hydration of a cellulose acetate and to a description of the products which result therefrom. It will be understood, however, that reagents analogous to acetic anhydrid, such as anhydrids of other monobasic fatty acids or other condensing agents of the class defined in my patent aforesaid, may be substituted in the confident expectation of analogous results.

The following example, which sets forth the best mode of procedure known to me, illustrates my process of partial hydration of a cellulose acetate and specifies the nature of the useful products derived therefrom.

*I. Production of the acetate.*—I proceed according to the specification of my patent aforesaid, using one hundred grams of dry cellulose, two hundred and forty grams of commercial acetic anhydrid, four hundred grams glacial acetic acid, and from ten to twenty grams of sulfuric acid ninety-five per cent. pure or better. The reaction which takes place according to the description of my patent aforesaid produces cellulose tetracetate, possibly cellulose triacetate in part. (This is difficult of absolute ascertainment and is my inference, which may be taken for what it is worth.) In the course of proceeding described by my patent aforesaid the next step would be to precipitate the acetate by mingling the solution with an excess of water—in other words, by suddenly "drowning" it in water.

II. *Partial or incomplete hydration of the acetate.*—Instead of proceeding in this way I next hydrate, partially or incompletely, the acetate while it is still in the solution resulting from the original reaction. If a small quantity of water be introduced into the acetate solution, local precipitation of the acetate will take place, and for the purposes of the process I am now describing this should be avoided. Therefore I employ glacial acetic acid as a distributer or diluent for the water required for partial hydration, and, further, although the small quantity of sulfuric acid present in the acetate reaction solution may be sufficient for the purpose I have found that the partial hydration is facilitated by introducing a small quantity of sulfuric acid to the acetate along with the water and the diluent glacial acetic acid. Thus I first prepare a mixture of glacial acetic acid, water, and sulfuric acid in the following proportions: ninety parts water, ten parts sulfuric acid, (ninety-five per cent. pure or better,) and one hundred parts glacial acetic acid. Then into the acetate solution produced by the treatment aforesaid of one hundred grams of dry cellulose I introduce this mixture of glacial acetic acid, water, and sulfuric acid in such quantity that from forty to forty-five grams (inclusive of water) are added to the cellulose-acetate solution. I mix the liquid thoroughly by stirring and allowing it to stand about twelve hours at a temperature of about 50° centigrade. Then I precipitate with an excess of water—that is to say, by drowning the cellulose-derivative solution, as in the case of the acetate produced by my patent aforesaid. From this precipitation I obtain a fine powdery solid which responds to and is identified by the following tests: It is soluble in pure acetone, plastic in chloroform, and soluble in acetylene tetrachlorid. It is insoluble in alcohol or water. This forms from its solutions films which are waterproof, tough, transparent, flexible, and extremely tenuous. A further peculiarity of this product is that if about five per cent. of water be added to the acetone (*i. e.*, five per cent. water to ninety-five per cent. of chemically-pure acetone) the product is soluble in the slightly-diluted acetone; but the films resulting therefrom, though flexible, tough, tenuous, and waterproof, instead of being transparent are white and opaque. The product is soluble in acetone solutions containing more water—as, for instance, in an eighty-per-cent. acetone; but from these solutions I have been unable to obtain any satisfactory film, the solution drying out to a crackled solid. The films obtained from the pure-acetone solutions of the above-described product and also from the said products when made plastic in chloroform are in every respect waterproof—that is to say, they are not only insoluble in water, but are unaffected even superficially by moisture or even by immersion in water. The term "waterproof" is better descriptive of the entire quality of these products than the term "insoluble in water." By way of illustration: A gelatin film made insoluble in water by treatment with formaldehyde is nevertheless so far affected by water as to be softened and made opaque thereby, and I have observed some cellulose derivatives which while insoluble in water are nevertheless affected and disintegrated thereby.

The product of the process above described is of commercial value not only by reason of its capacity to form flexible and tenuous films and plastic products in many respects similar to celluloid, but in that acetone commercially or chemically pure is available as a working vehicle. Chloroform, while more expensive than acetone, does not constitute so important a factor of cost in the treatment of this product, for the reason that the product requires a smaller quantity to become plastic than does the cellulose acetate for purposes of solution in chloroform. Commercially the acetone can be obtained about 99.5 per cent. pure; but a slightly-less pure acetone will serve. Even, as above stated, a ninety-five-per-cent. pure acetone will yield a waterproof and flexible film, but one which is opaque instead of being transparent. I have found that the purer the acetone the clearer and better are the films.

My process, as specifically exemplified above, employs from forty to forty-five grams of pure water in the treatment of acetate obtained from one hundred grams of dry cellulose. By employing quantities of water (in the glacial acetic-sulfuric-acid mixture) in smaller quantity than forty grams the solubility in pure acetone will be found to diminish by degrees as the water quantity is diminished down to about thirty-five grams of water, the resulting reaction yielding a precipitate which becomes more and more soluble in chloroform as the added water is diminished and less and less soluble in pure acetone. Precipitates from the larger quantities of water—namely, thirty-eight or thirty-nine grams—verge toward plastic in chloroform, and the precipitates from the smaller quantities of water—namely, thirty-five or thirty-six grams—will be found to be soluble in both pure acetone and chloroform, (though the solubility in acetone diminishes,) and films from these solutions are flexible and waterproof. By still further diminishing the proportion of pure water added the solubility in pure acetone diminishes in degree, passing from solubility to mere plasticity and then to a condition wherein there is no appreciable effect produced by pure acetone, the solubility in chloroform, however, remaining substantially the same. The behavior of these products of precipitation in respect to solubility in chloroform gradually approximates to that of the acetate produced by precipitation according to my Letters Patent aforesaid. The partially-hydrated acetate goes into solution in chloroform more readily than the acetate.

If to the acetate solution produced by treatment of one hundred grams of dry cellulose, as above, larger quantities of water than those called for by the typical example above described be added—namely, from forty-six grams upward—the hydration is soon found to result in a horny and refractory precipitate, which as the water quantity is increased progressively approximates to the physical characteristics of cellulose hydrate, although it contains a considerable proportion of the acetate and is not pure hydrate. Moreover, the total yield of precipitate progressively diminishes as the quantity of water used for hydration is increased. By using water in the acid-water mixture in abundant quantity—say enough to supply two hundred grams of pure water—hardly any precipitate can be obtained. The behavior of the precipitates formed by adding larger quantities of water than those stated in the typical example of good practice above described is, so far as I have been able to ascertain, of no consequence except to gratify scientific curiosity. They are at all events, so far as I know, incapable of forming films and are practically insoluble in any of the solvents which are effective as vehicles for the partially-hydrated acetate produced by the formula given above as the best practical example. I have found by experiment and demonstration that forty-five grams of water added as above stated to an acetate solution produced from one hundred grams dry cellulose is quite close to the limit for practical purposes. If, however, the original acetylation of the cellulose has been carried further—as, for instance, to the pentacetate condition—larger quantities of water will be found necessary for partial hydration to produce products of the same useful character as those given in the example above. It should also be borne in mind that if the mixture such as described in the above example be maintained at a lower temperature than 50° centigrade or be allowed to stand a shorter time than twelve hours, as above prescribed, the temperature being maintained at 50° centigrade, the desired precipitate for film-forming and for plastic uses may be obtained even though a larger proportion of water than that above specified is actually added to the mixture, for this reason, as I believe, that the reaction is progressive and if arrested at a time which under change of conditions is the equivalent of the time required for the complete reaction under the quantitative conditions stated in my specified best example yields practically the same results. Such a method, however, is, I am inclined to believe, uncertain and perilous, because with a surplus of water for partial hydration it is not easy to determine the exact conditions as to temperature and time which will yield the right result except by repeated and empirical trials to establish arbitrarily the standards of time and temperature for such conditions.

With respect to the behavior of my new product with its characteristic solvents, the descriptive term "soluble" should be understood to include the several gradations of solubility which verge into that form of solubility specifically described as "plasticity." Whether the solution is mobile in great or small degree the condition is of a solid which intimately associates itself with the "solvent," which is therefore an effective vehicle for the solid.

What I claim, and desire to secure by Letters Patent, is—

1. The method of producing cellulose derivatives which consists in first producing a substantially anhydrous acetyl cellulose and thereafter incompletely hydrating the acetyl cellulose.

2. The method of producing cellulose derivatives which consists in first forming a substantially anhydrous cellulose ester with the anhydrid of a monobasic fatty acid and subsequently incompletely hydrating the said cellulose ester.

3. The method of producing cellulose derivatives which consists in treating fibrous cellulose with glacial acetic acid and a condensing agent and acetic anhydrid, allowing acetylation to become well advanced and then adding water sufficient to cause the acetylated cellulose to become incompletely hydrated, and then precipitating the product.

4. A cellulose ester of a monobasic fatty acid, partially hydrated, soluble in both pure acetone and chloroform in degrees varying with the degree of hydration.

5. Cellulose acetate, partially hydrated, soluble in both pure acetone and chloroform in degrees varying with the degree of hydration.

6. A cellulose ester of a monobasic fatty acid, partially hydrated, waterproof, insoluble in alcohol, soluble in acetylene tetrachlorid, and soluble in both pure acetone and chloroform in degrees varying with the degree of hydration.

7. Cellulose acetate, partially hydrated, waterproof, insoluble in alcohol, soluble in acetylene tetrachlorid, and soluble in both pure acetone and chloroform in degrees varying with the degree of hydration.

Signed by me at Boston, Massachusetts, this 22d day of November, 1904.

GEORGE W. MILES.

Witnesses:
JOSEPH T. BRENNAN,
MARGARET A. DANIHER.